July 17, 1956 M. R. RICHMOND 2,755,463
DEMODULATING SYSTEM
Filed June 22, 1951 2 Sheets-Sheet 1
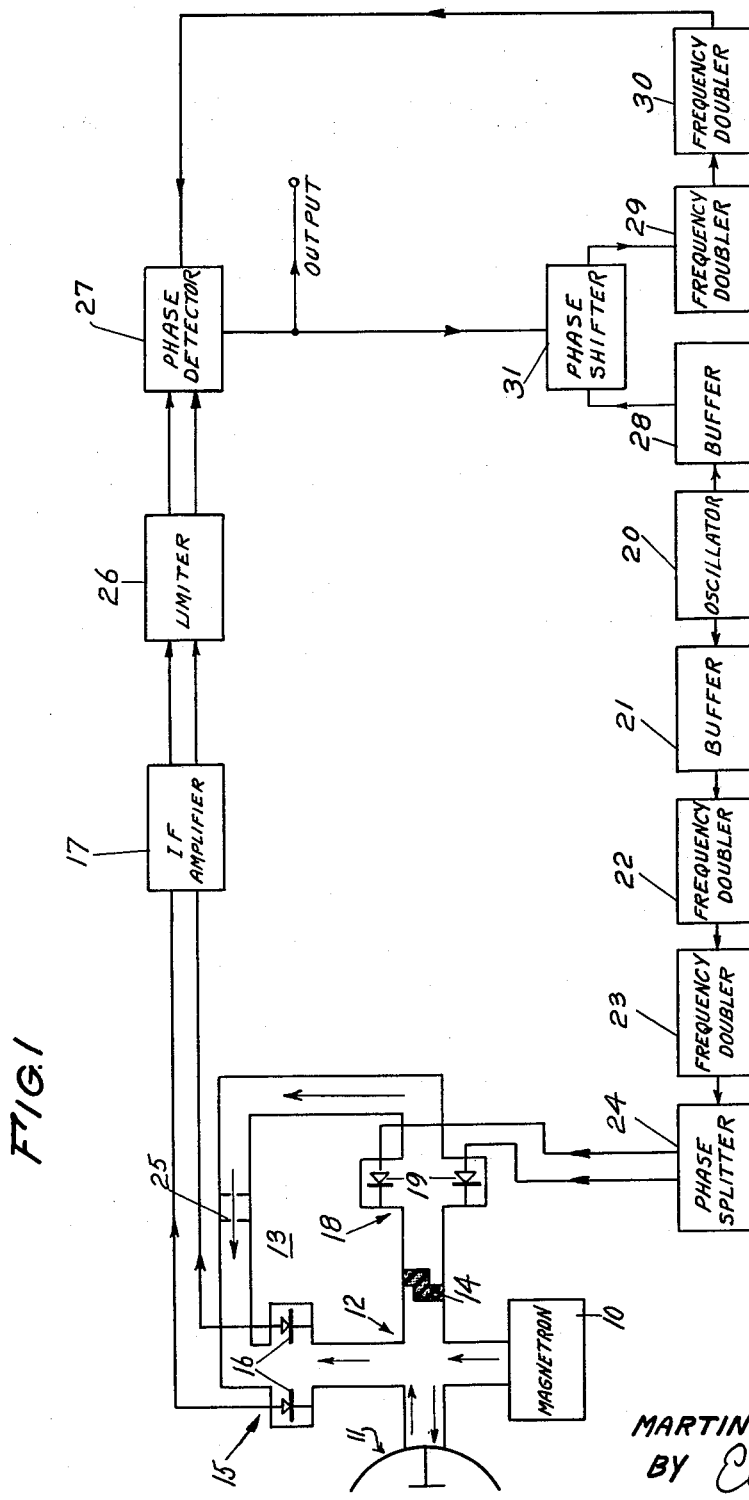
INVENTOR
MARTIN R. RICHMOND
BY Elmer J. Gorn
ATTORNEY

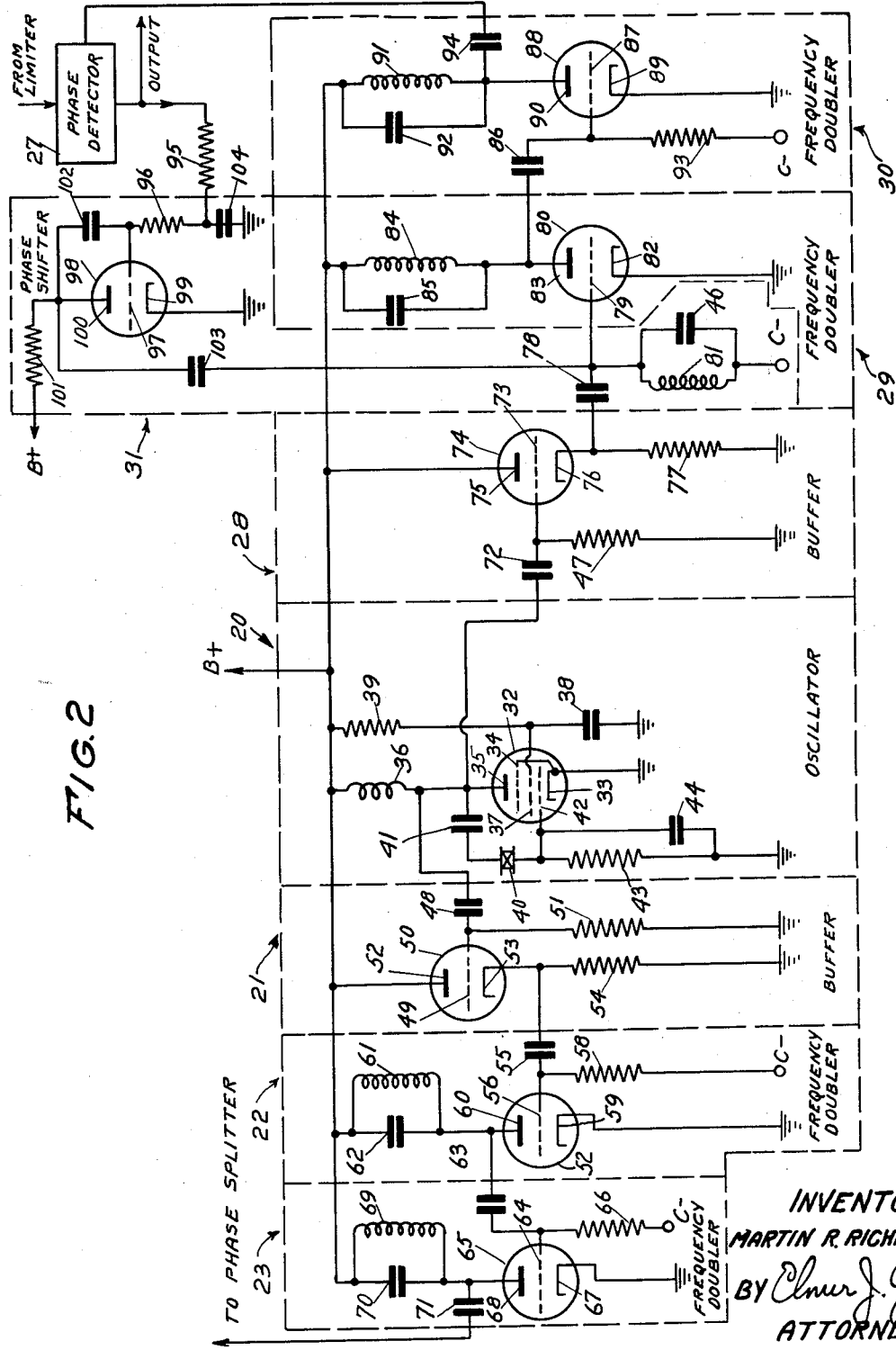

United States Patent Office 2,755,463
Patented July 17, 1956

2,755,463

DEMODULATING SYSTEM

Martin R. Richmond, Cambridge, Mass., assignor to Raytheon Manufacturing Company, Newton, Mass., a corporation of Delaware Application June 22, 1951, Serial No. 232,949

6 Claims. (Cl. 343—12)

This invention relates to demodulation systems, and more particularly to phase demodulation systems wherein a source of reference signals is used both as a local oscillator source for heterodyning purposes and as a reference signal source for a phase detector.

In radar systems, it is desirable that a single antenna be used for both transmitting and receiving purposes. In continuous wave radar systems, for example, of the Doppler or FM type, a substantial amount of feedthrough is encountered from the transmitting to the receiving circuits. This feedthrough signal contains modulation components which tend to mask the echo signal. If a phase modulation system is employed, amplitude modulation components of the feedthrough signal may be eliminated by limiting or clipping circuits. However, phase modulation components of the feedthrough signal, due, for example, to changed antenna impedance matches resulting from the movement, such as rotation of the antenna, cannot be eliminated by conventional circuitry.

This invention discloses circuits whereby the lower frequency phase modulation components of the feedthrough signal may be balanced out so that they will not mask the echo signals. Briefly, this is accomplished by shifting the phase of the reference signal applied to a phase detector to which is fed signals derived from the received echo signals. The degree of phase shift is controlled by the output of the phase detector, the polarity of the control being such that the loop comprising the phase shifter and the phase detector, together with the circuits in between, is degenerative. As a result, the low frequency phase modulation components are substantially eliminated from the output of the phase detector.

By this system the average phase position of the reference signal applied to the phase detector may be kept substantially zero with respect to the input signals, thereby producing conditions for optimum operation of the phase detector for the higher frequency received echo signals.

Other and further objects and advantages of this invention will become apparent as the description thereof progresses, reference being had to the accompanying drawings, wherein:

Fig. 1 illustrates a functional flow diagram of a radar system embodying this invention; and Fig. 2 illustrates a schematic diagram of the particular details of the source of reference signals and the phase shifter illustrated in Fig. 1.

Referring now to Fig. 1, there is shown a magnetron 10 feeding an antenna 11 through a magic T 12. The signals radiated from antenna 11 impinge on objects and are reflected thereby to produce echo signals which are received by antenna 11 and fed through magic T 12 to a mixer section generally designated at 13. The mixer section 13 may be of any well-known type, the one shown here being by way of example only. Mixer section 13 is connected to the magic T 12 in the following manner. Magic T 12 comprises a wave guide section having four legs, a first leg being connected to magnetron 10, a second leg being connected to antenna 11, a third leg being connected to an attenuator 14, and the fourth leg being connected to a detector 15. Detector 15 comprises a wave guide section having four arms, the first arm being connected to the magic T 12, two arms at right angles thereto terminating in shorts and containing crystals 16 whose outputs are connected to an I. F. amplifier 17. The fourth leg of the detector 15 is connected to a modulator 18 comprising a wave guide section having four arms. The arm opposite the arm connected to detector 15 is connected to the other end of attenuator 14 from the end connected to magic T 12. The two remaining arms of modulator 18 contain crystals 19 to which are fed a local oscillator signal. The local oscillator signal is generated by an oscillator 20 and is fed to a buffer 21 which, in turn, feeds the signal to a first frequency doubler 22. Frequency doubler 22, in turn, feeds the signal to a second frequency doubler 23 which feeds the signal to a phase splitter 24 which feeds the signal in phase opposition to crystals 19. This signal beats with the signal fed through the attenuator 14 from the magnetron 10 to produce a signal having upper and lower side bands. A filter 25 in the arm connecting modulator 18 with detector 15 eliminates the upper side band so that only the lower side band signal is fed to the detector 15. The filter 25 is shown here, by way of example, as irises. However, any desired filtering device may be used. The lower side band signal beats with the received echo signals fed to detector 15 from the antenna 11 and produces an output signal equal to the reference signal input to the modulator plus the difference signal between the radiated and received signal at antenna 11.

The signal fed to the I. F. amplifier 17 is amplified thereby and is fed through a limiter 26 to a phase detector 27. The output signal from oscillator 20 is also fed through a buffer 28, a phase shifter 31, a first frequency doubler 29 and a second frequency doubler 30 to phase detector 27. The output of phase detector 27 is fed to a phase shifter 31 which is connected to the output of buffer 28 to vary the phase of the signal fed from buffer 28 to frequency doubler 29.

Referring now to Fig. 2, there is shown the circuit details of the reference oscillator and the associated circuits. The oscillator 20 comprises a pentode 32 having the cathode 33 and suppressor grid 34 thereof connected to ground. Plate 35 of pentode 32 is connected to B+ through an R. F. choke 36. The screen grid 37 of pentode 32 is connected to ground through a bypass condenser 38 and to B+ through a voltage dropping resistor 39. The plate 35 is connected to one side of a crystal 40 through a condenser 41. The other side of crystal 40 is connected to the grid 42 of pentode 32 and to ground through a grid leak bias resistor 43 and condenser 44 in parallel. While this oscillator circuit is a standard crystal controlled Pierce oscillator circuit, any desired oscillator may be used.

Plate 35 is connected through a coupling condenser 48 to the grid 49 of a triode 50 which comprises a cathode follower. Grid 49 is connected to ground through a grid load resistor 51. The plate 52 of triode 50 is connected to B+. The cathode 53 of triode 50 is connected to ground through a cathode load resistor 54. Cathode 53 is also connected through a coupling condenser 55 to the grid 56 of a triode 57 which comprises a frequency doubler. Grid 56 is connected to a negative voltage source through a grid load resistor 58. Cathode 59 of triode 57 is connected to ground. Plate 60 of triode 57 is connected to B+ through an inductance 61 shunted by a condenser 62, condenser 62 and inductance 61 being of suitable values to resonate at twice the frequency of oscillator 20. The bias applied to grid 56 through a resistor 58 is sufficient to cause triode 57 to operate as a Class C amplifier, the output of which is rich in harmonics. Since inductance 61 and condenser 62 are tuned to the second harmonic of the input signal, the output appearing at plate 60 will be a substantially sinusoidal wave of twice the frequency of the oscillator 20.

Plate 60 is connected through a coupling condenser 63 to the grid 64 of a second frequency doubler comprising a triode 65. Grid 64 is connected to a negative bias voltage source through grid load resistor 66. Cathode 67 of triode 65 is connected to ground, and the plate 68 of triode 65 is connected to B+ through an inductance 69 and condenser 70 in parallel. Inductance 69 and condenser 70 are adjusted to resonate at four times the frequency of the oscillator 20, thereby doubling the frequency of the signal appearing at plate 60. The plate 68 is connected to a coupling condenser 71 to phase splitter 24 in Fig. 1. Phase splitter 24 may be of any desired type, such as a resistance coupled amplifier having both cathode and plate load resistors. The output signals developed across the plate and cathode load resistors are, respectively, in phase opposition, and are fed to the modulator 18.

The oscillator signal is also fed to a circuit feeding phase detector 27 in the following manner. The plate 35 of pentode 32 is connected through a coupling condenser 72 to the grid 73 of a triode 74. The grid 73 is connected to ground through a grid load resistor 47. The plate 75 of triode 74 is connected to B+, and the cathode 76 of triode 74 is connected to ground through a cathode load resistor 77. The cathode 76 is also connected through a coupling condenser 78 to the grid 79 of a frequency doubler triode 80. Grid 79 is also connected to a negative bias source through an inductor 81 and condenser 46 in parallel. The cathode 82 of triode 80 is connected to ground. The plate 83 of triode 80 is connected to B+ through an inductance 84 and condenser 85 in parallel.

Plate 83 is also connected through a coupling condenser 86 to the grid 87 of a second frequency doubler triode 88. The cathode 89 of triode 88 is connected to ground, and the plate 90 is connected to B+ through an inductance 91 and condenser 92 in parallel. The grid 87 is connected to a negative bias voltage source through a grid load resistor 93. The voltage doubler triodes 80 and 88 and their associated circuits are, respectively, similar to the triodes 50 and 57 such that the output appearing at the plate 90 has a frequency four times as great as the frequency of oscillator 20.

Plate 90 is connected through a coupling condenser 94 to the phase detector 27. Phase detector 27 may be of any desired type as, for example, a balanced detector, both sides of which are fed in phase from the condenser 94, while both sides are fed substantially out of phase from the limiter 26. The ouput of the phase detector 27 is fed through a resistor 95, and a grid load resistor 96 to the grid 97 of a reactance tube 98. The cathode 99 of tube 98 is connected to ground, and the plate 100 of tube 98 is connected to B+ through a load resistor 101. The plate 100 is also connected through a feedback condenser 102 to the grid 97. Plate 100 of tube 98 is connected through a condenser 103 to the grid 79 of the frequency doubler triode 80.

The phase shifter comprising tube 98 presents a capacitive impedance load to the grid 79, said impedance being in parallel with the impedance of the inductor 81 and condenser 46. The values of inductor 81, condenser 46, and the impedance produced in parallel therewith by the reactance tube 98 are adjusted to resonate at substantially the oscillator frequency. The impedance of coupling condenser 72 should be large at the oscillator frequency. Reactance tube 98 is of the well-known remote cut-off type such that, by varying the potential applied to the grid 97 thereof, the gain of the reactance tube 98, and hence the capacitive impedance presented by the plate circuit thereof, may be varied. This, in turn, varies the resonant frequency of the parallel resonant circuit of grid 79, thereby varying the phase of the signal fed thereto from oscillator 20.

The output of the phase detector 27 has the high frequency components thereof shunted to ground after passage through resistor 95 by means of a condenser 104 which is connected from the junction between resistors 95 and 96 to ground. The resistor 95 and condenser 104 act as a low pass filter circuit which allows passage of frequencies of, for example, from zero to three hundred cycles per second, but prevents passage of higher frequency signals to the grid 97 from the phase detector. As the gain of tube 98 is varied, the reactive component of the impedance connected to the grid 79 varies, thereby varying the phase of the signal applied to grid 79 from the cathode follower through the coupling condenser 78. The phase shift is increased through the frequency doubler stages and is applied to the phase detector. The output of the phase detector 27 is made of such a polarity that the phase shift produced by tube 98 will reduce the output of the phase detector at frequencies below three hundred cycles, thereby reducing the masking of the received echo signals by the phase modulation components of the signal which are produced within the system.

It is desirable that the gain of the phase shifting loop comprising the tube 98, the tubes 80 and 88, the phase detector 27 and their associated circuit components be sufficiently high so that the phase detector will have an average phase position which is close to its zero or center position, in other words, where the phase of the signal fed to the detector 27 from the condenser 94 is at an angle of substantially ninety degrees with respect to the signal fed to the phase detector 27 from the limiter 26. Thus, even though the phase of the signal fed to the mixer 13 varies slowly over long time periods, for example, due to thermal changes in the circuit parameters, or by mechanical movement thereof, the phase detector 27 will be maintained at substantially a zero average position, due to the compensating action of the phase shifter 31. As a result, the echo signals will be detected by the phase detector 27 when it is working under the most optimum conditions. Hence, a greater sensitivity and lesser distortion of the intelligence signal will be produced at the output of the phase detector.

The output of the phase detector may be used for any desired purpose, such as activating automatic tracking apparatus, or for presentation on a suitable device, such as a cathode-ray tube, according to well-known principles. In the particular system illustrated in Fig. 1, the output of the phase detector 27 will be a signal having a fundamental component of the Doppler frequency produced by the relative motion between the system and the object producing the reflected echo signals. This output may be amplified as, for example, by a video amplifier, and then scanned by a suitable frequency scanning system, for example, of the type described in my copending application, Serial No. 232,779, filed June 21, 1951, to determine the particular Doppler frequency present.

This completes the description of the specific embodiment of the invention illustrated herein. However, many modifications thereof will be apparent to persons skilled in the art without departing from the spirit and scope of this invention. For example, any desired type of oscillator, mixer, detector and phase shifter circuits may be used. In addition, this invention is not necessarily limited to radar systems, but may be utilized with phase modulated communications systems, if so desired. Accordingly, it is desired that this invention be not limited by the particular details described herein, except as defined by the appended claims.

What is claimed is:

1. A demodulation system comprising a source of intelligence signals, a source of reference signals, means for mixing said intelligence signals with said reference signals to produce resultant signals, means for comparing the phase of said reference signals with said resultant signals, and a phase shifter fed from said source of reference signals and feeding said comparing means, said phase shifter being controlled by output signals of said comparing means, said output signals having frequencies lower than the desired output intelligence signal frequencies.

2. A demodulation system comprising a source of intelligence signals, a mixer fed by said source of intelligence signals, a source of reference signals feeding said mixer, a signal phase comparator fed by signals derived from said mixer, said comparator being fed by signals derived from said source of reference signals, and means for varying the phase of the signals derived from said source of reference signals with respect to the signals at said source of reference signals in response to output signals of said signal phase comparator, said output signals having frequencies lower than the desired output intelligence signal frequencies.

3. An object detection system comprising a source of signals, means for radiating said signals, means for receiving echo signals reflected from said object, means for deriving intermediate frequency signals from said received signals comprising a source of reference signals and a mixer, a demodulation system fed by said intermediate frequency signals comprising means for comparing the phase of said reference signals with said intermediate frequency signals, and a phase shifter fed from said source of reference signals and feeding said comparing means, said phase shifter being controlled by output signals of said comparing means through a frequency multiplier, said output signals having frequencies lower than the desired output intelligence signal frequencies.

4. An object detection system comprising a source of signals, means for directively radiating said signals, means for receiving echo signals reflected from said object, means for deriving intermediate frequency signals from said received signals comprising a source of reference signals and a mixer, a demodulation system fed by said intermediate frequency signals comprising means for comparing the phase of said reference signals with said intermediate frequency signals, and a phase shifter fed from said source of reference signals and feeding said comparing means through a frequency multiplier, said phase shifter being controlled by output signals of said comparing means, said output signals having frequencies lower than the desired output intelligence signal frequencies.

5. An object detection system comprising a source of signals, means for radiating said signals, means for receiving echo signals reflected from said object, means for deriving intermediate frequency signals from said received signals comprising a source of reference signals and a mixer, a demodulation system fed by said intermediate frequency signals comprising means for comparing the phase of said reference signals with said intermediate frequency signals, and a phase shifter fed from said source of reference signals and feeding said comparing means, said phase shifter comprising a reactance tube fed from said comparing means with signals having frequencies lower than the desired output intelligence signal frequencies from said comparing means.

6. An object detection system comprising a source of signals, means for radiating said signals, means for receiving echo signals reflected from said object, means for deriving signals from said received signals comprising a source of reference signals and a mixer, a demodulation system fed by said intermediate frequency signals comprising means for comparing the phase of said reference signals with said intermediate frequency signals, and a phase shifter fed from said source of reference signals and feeding said comparing means through a frequency multiplier, said phase shifter comprising a reactance tube fed from said comparing means through a low frequency pass filter.

References Cited in the file of this patent
UNITED STATES PATENTS

| | | |
|---|---|---|
| 2,050,418 | Boerner | Aug. 11, 1936 |
| 2,147,810 | Alford | Feb. 21, 1939 |
| 2,248,727 | Strobel | July 8, 1941 |
| 2,422,074 | Bond | June 10, 1947 |
| 2,529,510 | Manley | Nov. 14, 1950 |
| 2,537,574 | Crosby | Jan. 9, 1951 |
| 2,540,076 | Dicke | Feb. 6, 1951 |